REEL HANDLING MECHANISM

Filed Aug. 25, 1961

INVENTOR.
MORRIS G. COHN
BY
[signature]
ATTORNEY 3,169,789
Patented Feb. 16, 1965

3,169,789

REEL HANDLING MECHANISM

Morris G. Cohn, 21 Knoll Lane, Roslyn Heights, N.Y.

Filed Aug. 25, 1961, Ser. No. 133,898
4 Claims. (Cl. 294—16)

The present invention relates to a reel handling mechanism and more particularly to a mechanism for removing, replacing, reversing and storing magnetic recording tape while it is partly on the feeder reel and partly on the take up reel of a tape recorder.

Tape recorders utilize a spindle which is the feeder spindle and another spindle which is the take up spindle. In most models the spindle on the left facing the machine is always the feeder spindle and the one on the right is always the take up spindle for recording or play back purposes. A reel may be a feeder reel or a take up reel depending upon which spindle it is located at a particular moment. The tape passes from the feeder reel through an open slit in the machine, where the recording or playback takes place, to the take up reel.

Magnetic tape is usually provided with two sensitized zones: one along the top portion of the tape and the other along the bottom half. The tape is first passed through the instrument to place a recording on one sensitized zone. The tape is then reversed so that the bottom half of the tape now becomes the top. This is accomplished by reversing the reels. The feeder reel now becomes the take-up reel and vice versa and, at the same time, what was the bottom of each reel now becomes the top. The second sensitized zone of the tape is now in a position to record or play back.

In reversing the tape or removing it for storage, the usual practice is first to collect the tape on one reel. This is time consuming. In addition when the tape is to be reversed it is necessary to pick up each reel from its spindle, turn it over, and place it on the proper spindle. If the tape has been collected on one reel, rethreading of the seond reel is necessary. If this is attempted while the tape is partly on both reels, it has been found that the tape frequently spills off a reel, becomes twisted, and sometimes is broken. At best, this operation requires considerable dexterity and care and is time consuming.

It is frequently desirable to remove the tape from the machine, store it and later to replace it in the machine at the same point where the recording or playing stopped originally. Usually this is done, by first collecting the tape on one reel and storing it. Then when it is desired to go on with that tape at the place left off previously, it must be replaced on the spindle, threaded to another reel, collected on the take up reel, and checked by playing until the original point is reached. This is time consuming. If to avoid this tedious operation, the reels are taken off the machine with the tape partly on each and left loose, there is the danger of the tape spilling off the reels because the tape is not under tension or because the reels are disturbed by accident.

The present invention provides a reel handling mechanism which accomplishes these operations quickly and easily without any of the untoward incidents of spilling, twisting or breaking of the tape and without requiring special skill or dexterity.

The object of the present invention is to provide a reel handling mechanism which will permit removal of both reels simultaneously from the recorder while the tape is partly on each reel while keeping the tape in its existing position for storage purposes or replacing both reels simultaneously on the recorder at will and accomplishing the operation with speed and ease and with safety to the tape.

Another object of the present invention is the provision of a reel handling mechanism which permits reversing of the tape while partly on each of the two reels and at the same time preventing the tape from spilling, twisting or breaking during the operation and accomplishing the operation quickly and without requiring special dexterity or care.

Another object of the present invention is provision for a tape storage, replacing and reversing mechanism usable on existing machines that use individual reels which is inexpensive to manufacture and simple to use.

Another object of the present invention is the provision of a reel handling mechanism which will prevent the tape from sliping off the reels during the reversing operation.

Another object of the present invention is the provision of a reel handling mechanism which will permit the two reels to be stored in the same relationship to each other in which they are taken off the spindles.

Another object of the present invention is the provision of a reel handling mechanism which permits reels to be easily substituted so that one tape can be used exclusively for letters, another tape for diary entries, etc. and so that the tapes can be freely and easily interchanged.

Another object of the present invention is the provision of a reel handling mechanism which will permit any slack in the tape to be taken up thus preventing slipping, twisting or breaking of the tape.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 1:
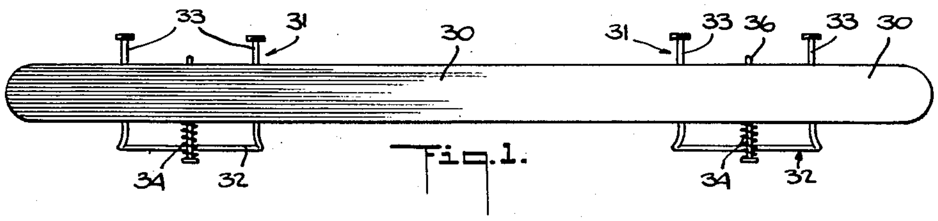
FIG. 1 is a top elevational view.

Referring more particularly to the drawing, showing a preferred embodiment of the present invention, the magnetic tape 1 is wound upon a feeder reel 2 and it is threaded on a take-up reel 3. The reels 2 and 3 are mounted on the spindles 4 and 5 of a tape recording instrument S through a central opening 6 in each reel, as is usual in such devices. The central opening has a plurality of extensions 6a emanating therefrom. It will be understood that when the tape is reversed the feeder reel 2 becomes the take-up reel and vice versa.

Figures 2, 3, 4:
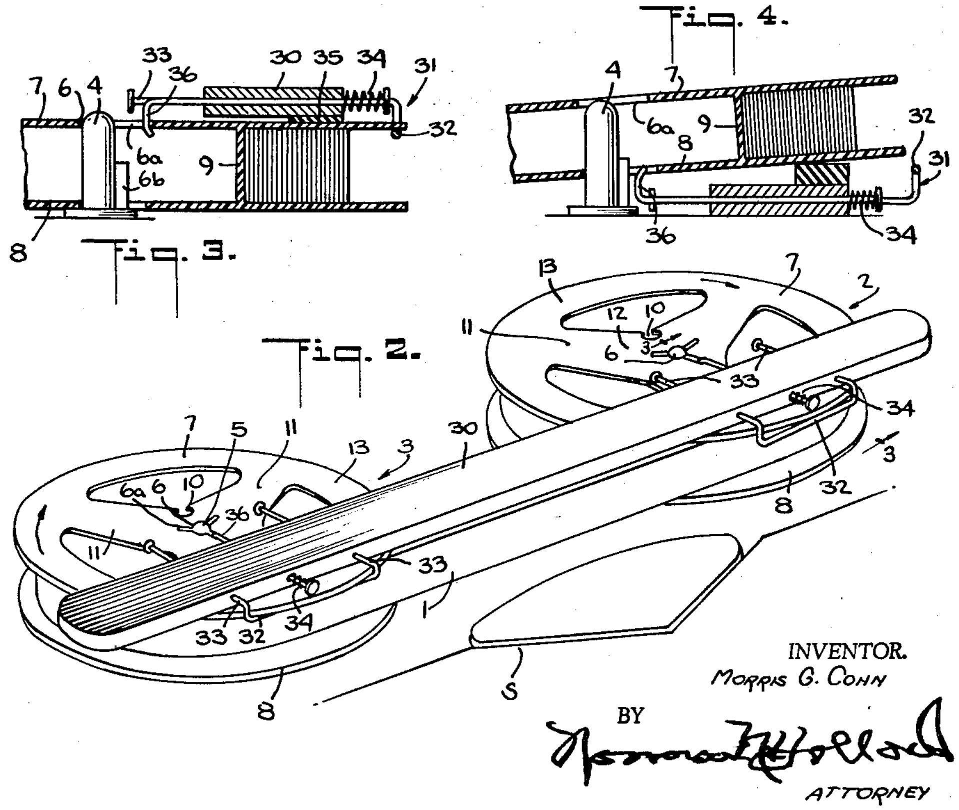
FIG. 2 is a perspective view showing the device in use on a recording instrument.
FIG. 3 is a sectional view taken along line 3—3 of FIG. 2.
FIG. 4 is a sectional view showing the position of the parts after the reels have been reversed.

The reels 2 and 3 are preferably substantially identical to each other and comprise a pair of side plates 7 and 8 joined together by ribs 9 (FIGS. 3 and 4). The plates 7 and 8 have holes in the center to form the central opening 6 (into which are inserted the spindles 4 and 5) and the extensions 6a (which receive the catch 6b on the spindle base). Each of the plates 7 and 8 is also provided with a plurality of openings 10 arranged around the central opening 6. Portions of the plates 7 and 8 are hollowed out to form a plurality of spokes 11 extending radially outwardly from a central hub 12 and joined together by an outer rim 13.

The handling mechanism of the present invention comprises a bar 30 which has a U-shaped gripping member 31 mounted at each end. The U-shaped gripping member 31 is in the form of a wire element in which the base 32 is offset with respect to the legs 33 and depressed as shown in FIG. 2. As shown in the drawing, legs 33 extend through the bar 30 and may be adjustable lengthwise and locked in various positions to permit the tape handling mechanism to be used with reels of different sizes.

Slidably mounted in the bar 30 between the legs 33 of the U-shaped gripping member 31 is a hook 36 which is adapted to cooperate with the base or edge gripping portion 32 of the U-shaped element 31 in holding each reel firmly, as will be described in greater detail below. The hook 36 is provided with a spring 34 which biases the hook 36 toward the bar 30 and means (not shown) may be provided to keep the hook perpendicular to the bar 30 so that it will not flip over during use. In addition, a resilient element, such as a rubber pad 35, having a smooth outer face, is positioned on the bar 30 adjacent the U-shaped element 31 and the hook 36.

With this structure, the hook 36 is first inserted in the extension *6a* of the opening 6 in the reel. The bar is moved back against the action of spring 34 until the base 32 referred to as the edge-gripping portion of the U-shaped element 31 is inserted beneath the plate 7 of each reel 2, as shown in FIG. 2. The bar 30 is then released so that the spring 34 expands thereby permitting each reel 2 and 3 to be grasped firmly between the hook 36 and the base portion 32 of the U-shaped gripping member 31. At the same time the rubber pad 35 is compressed as shown in FIG. 3.

With this instrument both reels 2 and 3 can be lifted and the reels can be reversed and reinserted into the proper spindles. This instrument permits the reels to be rotated slightly on the hook in order to take up any slack on the tape after the reels are removed from the spindle.

In order to release the reels, the bar 30 is moved against the action of the spring 34 until the edge-gripping portion 32 clears the edge of the reels. At this time the pads 35 expand to lift the reels slightly (FIG. 4) and the spring moves the hook 36 back until the hook strikes the bar 30 which prevents further movement of the hook. This permits the bar 30 together with hook 36 to be moved toward the spindles until the hook 36 clears the extension *6a* in the central opening 6 at which time the bar 30 can be pulled back and removed. Since the pads 35 expand to lift the reels slightly, as shown in FIG. 4, the bar 30 can be removed from beneath the reels without danger of the hook 36 being caught in any part of the reels.

It will thus be seen that the present invention provides an improved tape handling mechanism for removing, replacing and reversing tapes, which eliminates the necessity of threading the end of the tape on the exhausted reel and which also prevents the magnetic tape from becoming unwound during the reversing operation. The two reels can also be easily stored in that position, if desired, without the necessity of removing the free end of the tape from one of the reels.

The present invention thus provides a mechanism which accomplishes these operations quickly without spilling, twisting or breaking of the tape. Thus tapes can be easily and freely removed and replaced and material having similar subject matter can thus be easily recorded on a single tape although all the material is not recorded at one time and recording is interrupted by removing the reels to record different matter.

The present invention thus provides a tape handling mechanism which can be easily withdrawn when the reels are on the spindles after reversing even though the reversing bar is below the reels because the gripping mechanism is to one side of the spindle.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A mechanism for holding a pair of reels in spaced relation to each other when a continuous tape has portions of its length wound on each reel comprising a lift bar, a pair of members mounted in spaced relation on said bar for gripping a pair of reels near their peripheries, a pair of spring biased elements each mounted on said bar adjacent one of said members for gripping a pair of reels near their centers and a pair of resilient pads mounted in spaced relationship on said bar for urging an attached pair of reels away from said lift bar when disengaging said mechanism therefrom.

2. A mechanism for holding a pair of reels in spaced relation to each other when a continuous tape has portions of its length wound on each reel comprising an elongated flat lift bar adapted to overlie the sides of a pair of reels, a pair of U-shaped members adjustably mounted in spaced relation on said bar for engaging and gripping a peripherial portion of a pair of reels at the closed end of said U-shaped members, a pair of spring biased gripping hooks each mounted on said bar between the legs of a corresponding U-shaped member, said members and said hooks cooperable to hold a pair of reels on the lift bar and to allow limited rotary movement of said reels with respect to the lift bar, and a pair of resilient pads mounted in spaced relation on said bar for urging an attached pair of reels away from said bar when the mechanism is disengaged therefrom.

3. A mechanism for holding a pair of reels in spaced relation to each other when a continuous tape has portions of its length wound on each reel comprising an elongated flat lift bar adapted to overlie the sides of a pair of reels, a pair of U-shaped members adjustably mounted in spaced relation on said bar for engaging and gripping a peripherial portion of a pair of reels at the closed end of said U-shaped members, a pair of spring biased gripping hooks each mounted on said bar between the legs of a corresponding U-shaped member, said members and said hooks cooperable to hold a pair of reels on the lift bar and to allow limited rotary movement of said reels with respect to the lift bar whereby a pair of reels and the tape may be lifted by said mechanism.

4. A mechanism for holding a pair of reels in spaced relation to each other when a continuous tape has portions of its length wound on each reel comprising an elongated lift bar adapted to overlie the sides of a pair of reels, a pair of gripping members each having spaced legs and a closed end connecting said legs mounted on said bar in spaced relationship to each other for engaging and gripping a peripheral portion of a pair of reels at the closed end of said members, a spring-biased gripping hook associated with each of said gripping members, said hook and the adjacent closed end of the gripping member cooperating with each other to hold a reel on the lift bar and to allow limited rotary movement of said reel with respect to the lift bar whereby a pair of reels and the tape may be lifted by said mechanism.

References Cited in the file of this patent

UNITED STATES PATENTS

| | | |
|---|---|---|
| 1,575,576 | Guitian | Mar. 2, 1926 |
| 2,780,486 | Loughlin | Feb. 5, 1957 |
| 2,800,353 | Denham | July 23, 1957 |
| 2,943,805 | Loewe | July 5, 1960 |
| 3,030,044 | Giannoccora | Apr. 17, 1962 |

FOREIGN PATENTS

| | | |
|---|---|---|
| 221,073 | Switzerland | of 1942 |